United States Patent Office 3,096,652
Patented July 9, 1963

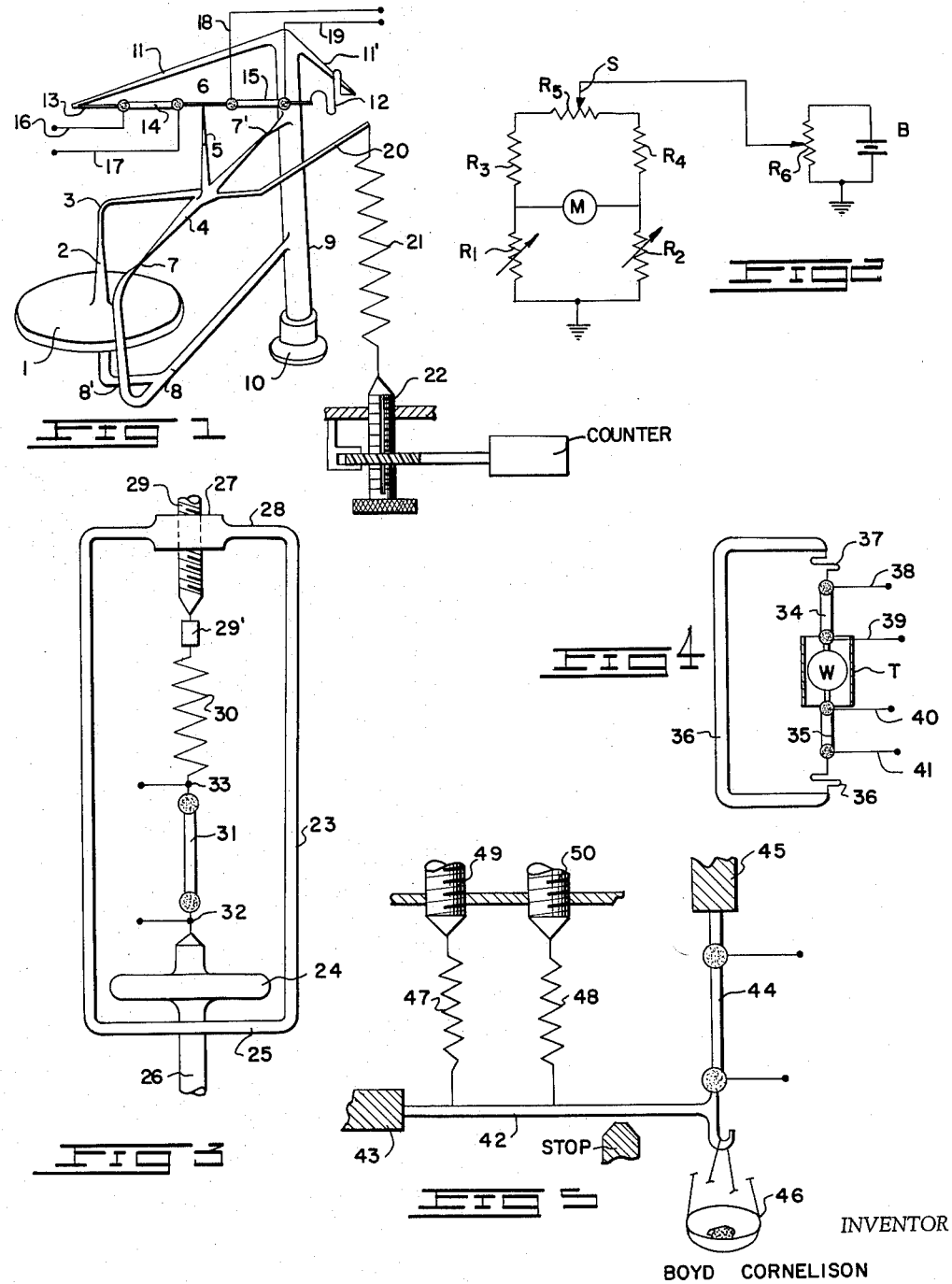

3,096,652
STRAIN GAUGE
Boyd Cornelison, Dallas, Tex., assignor to Texas Instruments Incorporated, Dallas, Tex., a corporation of Delaware
Filed Nov. 14, 1960, Ser. No. 69,208
10 Claims. (Cl. 73—398)

This invention relates to highly sensitive force measuring devices utilizing the piezoresistive effect of semiconductors.

In general, accurate quantitative measurements of force are impaired by the presence of such undesirable effects as temperature differentials, differential expansions, hysteresis, lag, drift, non-linear relationships, friction, etc., in either or both the structure utilized in transmitting the force in response to the condition and to the force sensing element which provides an indication or measure of the transmitted force.

The pressure measuring instruments of the prior art have been confronted with the problem of converting a small movement, usually of a linear nature, to a linear, readable indication of the desired accuracy. Until the present invention, the impairments enumerated above have invariably been present to some degree in those instruments, thus causing delayed readings, drifts, hysteresis, shifting zeros or reference positions, non-linear relationships, etc., usually brought about by the necessarily delicate mechanisms and complicated linkages involved. This invention obviates the above disadvantages by combining the extremely desirable elastic and thermal properties of fused quartz with the piezoresistive effect of semiconductor materials in such a manner as to convert a small force to a relatively large electrical signal. The force, which may be produced by a differential pressure, acceleration or a weight is transmitted to the semicoductor sensing element having piezoresistive properties in a linear manner with negligible frictional losses and without complicating linkages or lost motion. The instrument may be so designed as to transmit a signal directly in response to a measurable force or it may be made null reading and have the property of extreme ruggedness. In at least one form of the invention, the instrument is so designed as to be insensitive to position and is capable of providing a reading of equal accuracy either upside down or lying on its side.

The sensing element of this invention which provides an electrical output signal in response to applied force, comprises a semiconductor material such as silicon or germanium or the intermetallics such as gallium arsenide or indium antimonide in the form of a single crystal and in the shape of a relatively long bar. When such a bar is strained, its resistance changes due to piezoelectric phenomenon. In one form of the present invention, two such semiconductor sensing elements are used in a bridge circuit in such a manner that sensitivity is greatly enhanced and at the same time adverse temperature effects tend to cancel out to the extent that errors caused thereby are of no significance.

It is therefore an object of this invention to provide a force-measuring instrument utilizing the piezoresistive properties of a bar of monocrystalline semiconductor material.

It is a further object of the invention to provide a force measuring instrument combining the desirable elastic and thermal properties of fused quartz with the piezoresistive properties of certain semiconductor materials.

A still further object of the invention is to provide a force measuring instrument which is extremely rugged in construction, light in weight, having moving parts practically devoid of friction and not subject to wear.

Another object of the invention is to provide a highly sensitive instrument for providing an electrical measurement of a mechanically applied force and which will provide an accurate reading regardless of its position.

A detailed description of the invention follows with reference to the drawing in which:

FIGURE 1 is a perspective view of one form of the invention for measuring a small differential pressure and utilizing a pair of sensing elements;

FIGURE 2 is a bridge circuit in which the sensing elements are incorporated in the arms of the bridge;

FIGURE 3 is a simplified embodiment of a novel transducer according to the invention;

FIGURE 4 illustrates an accelerometer utilizing the principles of the invention; and FIGURE 5 is a diagrammatic showing of an analytical balance utilizing the piezoresistive sensing element of the invention.

Referring to FIGURE 1, a fused quartz sealed bellows 1, either partially or wholly evacuated, is rigidly supported on a bar 8 adjacent one end thereof, the bar being secured at its other end to an upright post 9 mounted in a supporting base 10. Extending upwardly from the center of the movable portion of the bellows 1 is a thrust bar 2, from the upper end of which extends one arm of a bell crank member 3. The end of the other arm of the bell crank member is secured to an axle 4 which extends perpendicularly to the substantially horizontally extending arm of the bell crank. The parts so far described are of fused quartz, and the axle 4 is rotatively secured between the post and an upright 8' of fused quartz extending upwardly from the free end of the bar 8, by integrally connected attenuated portions 7 and 7' of fused quartz and which form torsion hinges to permit rotative movement of the axle 4 about its horizontal axis. A pair of angularly related arms 11, 11' of fused quartz and subtending an angle of less than 180 degrees, extend horizontally from the upper end of the post 9.

Extending between the free ends of the arms 11 and 11' are two axially alined piezoresistive elements 14 and 15 in the form of relatively long bars of semiconductor material such as monocrystalline silicon, germanium, gallium arsenide or indium antimonide. As mentioned before, these elements have the property of greatly changing their resistivity when subjected to strain. The piezoresistive elements 14 and 15 in the form of elongated bars, are rigidly connected together at their adjacent ends by a rigid link 6 of fused quartz which is cemented to the respective ends of the elements 14 and 15. A polymerizing plastic sold under the trade name Re Dux by Resin Products Company of Elizabeth, New Jersey, is an example of a suitable cement. Of course, other types of bonds, such as a quartz-to-metal seal with the semiconductor material soldered to the metal, may be used. Leads 17 and 18 are connected to the respective ends of the semiconductor bars and extend through the cement. The other end of element 14 is rigidly secured to arm 11 by means of a fused quartz connector 13 cemented to the said other end of the element and to which lead 16 is connected. The other end of element 15 is connected to arm 11' through a resilient member 12. A lead 19 is connected to and extends from the other end of element 15 through the cement which secures it to one end of the resilient member 12, the other end of the resilient member being connected to arm 11'. In order to translate rotational movement of axle 4 to linear movement of the rigid link 6, a cantilever arm 5 is secured to and extends between the axle 4 and link 6.

The piezoresistive elements 14 and 15 are respectively connected in two arms of a Wheatstone bridge as shown in FIGURE 2 in which the element 14 is shown as a variable resistance $R_1$ and element 15 as a variable resistance $R_2$. Resistance $R_3$ is connected in series with $R_1$ to one terminal of a potentiometer $R_5$ and resistance $R_4$ is connected in series with $R_2$ to the other terminal of the potentiometer $R_5$. A slider S provides a potential from an adjustable voltage source provided by the potentiometer $R_6$ connected across battery B, which may be an A.C. source, if so desired, one terminal of the potentiometer $R_6$ being connected to the junction of $R_1$, $R_2$. A meter M is connected between the common junctions of $R_1$, $R_3$ and $R_2$, $R_4$. In an illustrative form of the operation of the device, the fused quartz bellows 1 may be evacuated to about $10^{-6}$ mm. of mercury and sealed. The entire device including the bellows may then be enclosed in a pressure vessel. The bridge network in which the piezoresistive elements are connected is then balanced by the slider S of the potentiometer $R_5$, to obtain a null reading on meter M. When the atmosphere in the pressure vessel is decreased, the fused quartz bellows expands, moving thrust bar 2 upwardly to cause bell crank 3 to rotate the axle 4 about its axially extending torsional hinges 7, 7'. In turn, cantilever arm 5 rotates so that its upper extremity, which is connected to rigid link 6, moves to the right as shown in FIGURE 1 to increase tension on element 14 and decrease tension on element 15, which tension is normally continuously applied by means of resilient member 12 when the structure is assembled. This change in the tension on elements 14 and 15 increases the resistance $R_1$ and decreases the resistance $R_2$ to unbalance the bridge, producing an indication on meter M.

The instrument may be made null reading if so desired, and to accomplish this a lever 20 is integrally secured to the junction of bell crank arm 3 and cantilever arm 5 with axle 4, and a tension spring 21, which may be of fused quartz is connected at one end to the free end of arm 20, the other end of the spring being rotationally secured to a micrometer screw generally indicated as 22 which upon rotation moves vertically to vary the spring tension. The micrometer screw may be connected by appropriate gearing to a counter to indicate the axial and angular positions of the screw. When the bridge of FIGURE 2 is first balanced prior to evacuation of the vessel in which the instrument is placed, the spring 21 is under predetermined tension and the reading of the counter attached to the micrometer is noted. Upon unbalance of the bridge in response to evacuation of the vessel, the meter M departs from its zero or balance position due to change in the values of resistances $R_1$ and $R_2$ in opposite directions. To return the meter to its null or zero reading position, the tension of the spring 21 is changed by rotation of the micrometer screw to restore the original tensions to elements 14 and 15 until the bridge is rebalanced as noted from meter M. The new reading on the micrometer attached counter will provide an indication of the pressure change in the vessel and may be calibrated in terms of pressure.

As can be seen from the above description of the device of FIGURE 1, a highly sensitive and accurate instrument for determining slight pressure changes has been provided which is free of error due to the extremely low coefficient of expansion of quartz. Furthermore, variations in the resistive properties of the semiconductor elements 14 and 15 are compensated by providing one in each arm of the Wheatstone bridge shown in FIGURE 2, and a minimum of loss occurs by friction of the moving parts due to the use of the torsion connections 7 and 7'.

FIGURE 3 illustrates a simplified form of the invention in which a substantially rectangular frame member 23 of fused quartz is provided. A pressure sensitive fused quartz element 24, similar in construction to the bellows 1 of FIGURE 1, is secured to one end 25 of the frame. The pressure sensitive element may be evacuated and sealed or its interior may be connected by tube 26 to a pressure source which is varied in response to a change in a condition which it is desired to measure. Threaded into an enlarged portion 27 of the opposite end 28 of the frame member 23 is a micrometer screw 29 carrying at its inner end an element 29' to which one end of a fused quartz spring 30 is secured. Mounted between the other end of the spring and the bellows member 24 is a semiconductor bar 31 having piezoresistive properties, as described in connection with elements 14 and 15 of the embodiment of FIGURE 1. The members 32 and 33 connecting the ends of the element 31 to the members 24 and 29, respectively, are of conductive material to which leads are connected for connection to a circuit for sensing variations in resistance of element 31. The element 29' is a dimensionally temperature sensitive element of a material to compensate for dimensional changes due to temperature of the arrangement as a whole. The element 29' is of a material having a coefficient of expansion in a direction to compensate for any expansion due to temperature of the device as a whole and which includes the spring, micrometer screw, frame and bellows. The piezoresistive element 31 may be arranged in one arm of a bridge circuit similar to that shown in FIGURE 2. Upon movement of the bellows 24 in response to variations in ambient pressure when the bellows is sealed, or changes in pressure coupled to the interior of the bellows upon changes of a condition to be measured, the tension on element 31 will change. If the bridge has been previously balanced, the meter will indicate an unbalance which can be read directly, or micrometer screw 29 may be adjusted to vary tension of the spring 30 until tension on element 31 is restored as indicated by a null position of the meter indicator, as in the previous embodiment.

An arrangement in which the piezoresistive elements are utilized as the sensing element of an accelerometer is shown in FIGURE 4. In this arrangement, the sensitive piezoresistive elements 34, 35 are carried between the arms of a U-shaped fused quartz frame 36. The resilient members 37 and 38 are each, respectively, secured at one end to one arm of the frame and at the other end to one of the piezoresistive elements. A mass W is secured to the adjacent ends of the piezoresistive elements. Terminal leads 38, 39, 40 and 41 are connected to the ends of the elements 34 and 35 and extend through the insulating cement securing the elements to the resilient members and to the mass. The elements 34, 35 may be connected in a bridge circuit arrangement as depicted in FIGURE 2, such that a force acting on mass W due to acceleration in a direction parallel to the axis of the sensing elements 34, 35 can be measured. In order to confine the movement of the mass W in response to a component of the acceleration only in a direction parallel to the lengths of the sensing elements 34 and 35, a cylindrical member or a circular array of bars generally shown as T may be provided to surround and constrain the mass to the aforesaid desired direction of movement.

A simple analytical balance utilizing the principles of this invention is illustrated in FIGURE 5. A resilient cantilever arm 42 is mounted in a support 43 at one end. The free end of the arm is suspended from one end of a piezoresistive sensing element 44 as above described and which is secured at its other end to an overhead support 45. Cement is utilized to secure both ends of the bar 44. A pan 46 is suspended from the free end of cantilever arm 42 for supporting a substance to be weighed. Changes in the resistance of element 44 by the weight of the substance in pan 46, may be determined by the use of a bridge circuit arrangement incorporating the sensing element 44 as discussed above.

In order to obtain a null reading on the meter of the bridge, spring members 47, 48 are secured at one end to the cantilever arm 42 and at their other ends to micrometer screws 49 and 50. The micrometer screws, one of which may constitute a coarse adjustment and the other a fine adjustment, vary the tensions of the springs 47, 48 to restore bridge balance and the weight of the substance in pan 46 may be determined from the micrometer readings.

In all of the embodiments shown, either a single or a plurality of piezoresistive sensing elements may be utilized. A variety of mechanical and electrical arrangements for varying the tensions on such sensing elements and measuring their changes in resistance may be utilized without departing from the spirit and scope of the invention.

What is claimed is:

1. A force measuring device comprising a support member having a pair of spaced projecting arms and formed of fused quartz, at least one elongated sensor element having an electrical resistance variable in response to variation in its tension in the direction of its length and connected at its ends between said spaced arms, means engageable with one end of the sensor element and responsive to an applied force for subjecting said element to a change in tension in the direction of its length from an initial value, said last-named means comprising a bar of fused quartz, torsion hinges of fused quartz connecting the ends of the bar to the support for rotation of the bar about its longitudinal axis, means extending between the bar and one end of the sensor element for converting a rotational force on said bar to a linear force on the sensor element in the direction of its length, pressure sensitive means for applying a rotational force to the bar, and electrical means coupled to the ends of at least one sensor element for detecting variations in its resistance in accordance with changes in the magnitude of the force.

2. A force measuring device in accordance with claim 1 in which the sensor element is a semiconductor of monocrystalline form.

3. A force measuring device in accordance with claim 1 in which the pressure sensitive means includes a bellows of fused quartz mounted on the support member, and means extending between bellows and the bar for imparting a rotational force to the bar by the bellows in response to a pressure differential between the exterior and interior of the bellows.

4. A force measuring device in accordance with claim 1 including adjustable means coupled to said element for restoring the tension thereon to the initial value, and an indicator operable by the adjustable means.

5. A force measuring device in accordance with claim 1 including a second like sensor element interposed lengthwise between an arm on the support and an adjacent end of the first element, resilient means for maintaining said elements under tension between the arms of the support, said electrical means comprising a balanceable bridge circuit, each of the arms of which includes a respective sensing element, means for energizing the bridge circuit and a meter connected to the circuit for indicating the state of balance of the circuit.

6. A pressure-measuring system comprising an elongated sensing bar of monocrystalline silicon which varies its electrical resistance in response to changes in the tension thereof in the direction of its length, fixed support member means composed of quartz, resilient means connecting one end of said sensing bar to said support means and adapted to apply tension to said bar, a movable member engaging the other end of said bar, a hollow quartz bellows mechanically interconnecting said movable member with said support means whereby variations in the relative pressures on the inside and outside of said bellows will vary the tension on said bar, and electrical means having a first input terminal connected to said one end of said bar and a second input terminal connected to said other end of said bar and adapted to indicate the resistance thereof.

7. A force measuring system comprising:
(a) support means having a pair of spaced arms and formed of fused quartz,
(b) an elongated sensor element exhibiting an electrical resistance variable in response to tension in the direction of its length,
(c) means connecting the sensor element in tension between the pair of spaced arms,
(d) a bar of fused quartz,
(e) torsion hinges of fused quartz connecting the ends of the bar to the support means to permit rotation of the bar about its longitudinal axis,
(f) means coupling the bar to one end of the sensor element for converting a rotational force on the bar to a linear force on the sensor element in the direction of its length,
(g) pressure sensitive means for applying a rotational force to the bar,
(h) and electrical means coupled to the ends of the sensor element for detecting variations in its resistance in accordance with changes in the magnitude of the force.

8. Apparatus according to claim 1 wherein the pressure sensitive means includes a bellows of fused quartz engaging the support means on one side and the bar on the other side so that a rotational force is imparted to the bar in response to a pressure differential between the exterior and interior of the bellows.

9. A force measuring system comprising:
(a) support means having a pair of spaced arms and formed of fused quartz,
(b) an elongated piezoresistive semiconductor strain-sensing element exhibiting an electrical resistance variable in response to tension in the direction of its length,
(c) resilient tensioning means connecting the strain-sensing element in tension between the pair of spaced arms,
(d) a bar of fused quartz,
(e) torsion hinges of fused quartz connecting the ends of the bar to the support means to permit rotation of the bar about its longitudinal axis,
(f) fused quartz means coupling the bar to one end of the strain-sensing element for converting a rotational force on the bar to a linear force on the element in the direction of its length,
(g) force responsive means for applying a rotational force to the bar,
(h) and electrical means coupled to the ends of the strain-sensing element for detecting variations in its resistance in accordance with changes in the magnitude of the force.

10. Apparatus according to claim 9 wherein a spring member engages said bar to impart a rotational force thereto in a direction opposite that provided by the force responsive means.

References Cited in the file of this patent
UNITED STATES PATENTS

| | | |
|---|---|---|
| 2,258,613 | Kannenstine et al. | Oct. 14, 1941 |
| 2,279,261 | Crawford et al. | Apr. 7, 1942 |
| 2,564,416 | Wildhack | Aug. 4, 1951 |
| 2,704,326 | Whitson et al. | Mar. 15, 1955 |
| 2,732,718 | Cornelison | Jan. 31, 1956 |
| 2,738,678 | Cherry et al. | Mar. 20, 1956 |
| 2,963,911 | Courtney-Pratt et al. | Dec. 13, 1960 |